United States Patent [19]
Pennella

[11] 3,878,122
[45] Apr. 15, 1975

[54] REGENERATION OF RUTHENIUM HYDRIDE COMPLEX ISOMERIZATION CATALYSTS

[75] Inventor: Filippo Pennella, Bartlesville, Okla.

[73] Assignee: Phillips Petroleum Company, Bartlesville, Okla.

[22] Filed: Oct. 26, 1973

[21] Appl. No.: 409,810

[52] U.S. Cl. ...... 252/411 R; 252/431 P; 260/429 R; 260/683.2
[51] Int. Cl. ............................................. B01j 11/02
[58] Field of Search ..................... 252/411 R, 431 P; 260/429 R, 683.2

[56] References Cited
UNITED STATES PATENTS

| | | | |
|---|---|---|---|
| 3,488,400 | 1/1970 | Candlin et al. ................... | 212/431 P |
| 3,538,133 | 11/1970 | Knoth .............................. | 260/429 R |
| 3,793,257 | 2/1974 | Pennella et al. .................. | 260/683.2 |

*Primary Examiner*—Arthur P. Demers
*Attorney, Agent, or Firm*—Neuman, Williams, Anderson & Olson

[57] ABSTRACT

Ruthenium hydride complexes containing tertiary phosphine, arsine or stibine ligands which are useful as catalysts for isomerization of olefins are effectively regenerated by contact with hydrogen.

4 Claims, No Drawings

REGENERATION OF RUTHENIUM HYDRIDE COMPLEX ISOMERIZATION CATALYSTS

This invention relates to regeneration and maintenance of activity of ruthenium hydride complexes containing tertiary phosphine, arsine or stibine ligands which are useful isomerization catalysts.

BACKGROUND OF THE INVENTION

The copending application Ser. No. 194,698 filed Nov. 1, 1971, now U.S. Pat. No. 3,793,257, discloses and claims the invention wherein the double bond of an isomerizable olefin reactant is shifted by contact with a ruthenium hydride complex containing tertiary phosphine, arsine or stibine ligands.

The ruthenium hydride complex employed according to that invention can be represented by the formula $$(R_3Q)_3RuH_2Z$$

wherein each Q is independently selected from phosphorus, arsenic, and antimony; Z is selected from $H_2$, $N_2$ or $NH_3$; and wherein each R is independently selected from organic radicals containing up to 20 carbon atoms. Preferably the organic radical is free of active hydrogen atoms and reactive unsaturation. Preferred R groups are alkyl, cycloalkyl and aryl hydrocarbyl radicals and mixtures thereof, such as alkaryl, aralkyl, alkcycloalkyl, with each R group containing up to 10 carbon atoms.

Some examples of suitable ruthenium complexes are: (triphenylphosphine)$_3$RuH$_4$, (triethylphosphine)$_3$-RuH$_2$(N$_2$), [(4-methylphenyl)$_3$phosphine]$_3$-RuH$_2$(NH$_3$), (phenyldimethylphosphine)$_3$-RuH$_4$, (diphenylmethylphosphine)$_3$RuH$_2$(N$_2$), (dimethyllaurylarsine)$_3$RuH$_2$(NH$_3$), (trimethylarsine)$_3$RuH$_4$, (tribenzylarsine)$_3$-RuH$_2$(N$_2$), (tricyclohexylarsine)$_3$-RuH$_2$(NH$_3$), (trieicosylarsine)$_3$-RuH$_4$, (triphenylstibine)$_3$RuH$_2$(N$_2$), [(4-methylcyclohexyl)$_3$phosphine]$_3$RuH$_2$(NH$_3$), (tridecylstibine)$_3$RuH$_4$, [(4-fluorophenyl)$_3$-phosphine]$_3$RuH$_2$(N$_2$), [(4-chlorophenyl)$_3$-phosphine]$_3$RuH$_2$(NH$_3$), (trioctylstibine)$_3$RuH$_4$, (triisobutylstibine)$_3$RuH$_2$(N$_2$), (triphenylphosphine)$_2$(triphenylarsine)RuH$_2$(NH$_3$), (triphenylphosphine)$_3$-RuH$_2$(N$_2$) and the like and combinations thereof.

The ruthenium hydride complexes can be prepared by any convenient method known in the art. Generally convenient methods are illustrated in the *Journal of the American Chemical Society* (JACS) 90, 7172 (1968) and *Journal of the American Chemical Society* 92, 3011 (1970). An example of a convenient method is the reaction of a suitable ruthenium compound with an alkali metal borohydride in the presence of an alcohol, such as the reaction resulting from an admixture of dichlorotris(triphenylphosphine)ruthenium and sodium borohyride in methanol to yield tetrahydridetris(triphenylphosphine)ruthenium.

The ruthenium dinitrogen and ammonia complexes can be prepared conveniently by the addition of nitrogen or ammonia directly to a (R$_3$Q)$_3$RuH$_4$ complex. A general procedure is provided by *Journal of the American Chemical Society* 90, 7172 (1968) and *Journal of the American Chemical Society* 92, 3001–3016 (1970).

The ruthenium complexes employed are air-sensitive and are generally unstable in the presence of air or oxygen-containing atmospheres. Accordingly, the preparation and use thereof should exclude or appreciably restrict air or oxygen, as well as exclude any reactive substance or atmospheres which tend to reduce the effectiveness of the complex in an isomerization process.

In general, the ruthenium complexes have limited solubility in commercially important olefin isomerization process feedstocks. Advantageously, in some cases, therefore, the complex is employed in the presence of substantially inert solvents to facilitate mixing of olefin reactant and ruthenium catalyst. Representative inert organic solvents which can be used include aromatic hydrocarbons including benzene, toluene, ortho-xylene, meta-xylene, para-xylene, as well as other inert solvents including tetrahydrofuran and similar solvents.

The ruthenium complexes can be employed in heterogeneous catalytic olefin isomerization reactions by depositing the complex on a solid inorganic oxide catalyst support. Such support materials are commonly known as refractory oxides and include synthetic materials as well as acid treated clays or the crystalline aluminosilicates known in the art as molecular sieves. Synthetic refractory oxides are preferred. Exemplary synthetic refractory oxides include silica, alumina, silica-alumina, silica-magnesia, boria-alumina, silica-alumina-zirconia, and silica-titania-zirconia Preferably, the support, prior to contact with the complex, is dried by calcining. Such a supported catalyst preferably contains from about 1 to about 10 weight percent ruthenium complex based on the weight of support.

Any isomerizable olefin can be employed, including acyclic monoenes and acyclic polyenes embracing dienes, trienes, conjugated diolefins, nonconjugated diolefins, mixtures thereof and the like. The olefins can contain cycloalkyl or aryl substituents or mixtures thereof. Because of their commercial importance, preferred olefins contain from 4 to 20 carbon atoms per molecule, and more preferably from 4 to 10 carbon atoms per molecule. Representative olefins are the following: 1-butene, 1-pentene, 1-hexene, 3-hexene, 1-decene, 5-methyl-1-hexene, 7-methyl-1-nonene, 5-ethyl-1-octene, 2-butene, 2-pentene, 4-methyl-2-hexene, 4-phenyl-1-butene, 5-cyclopentyl-1-pentene, 4-phenyl-2-butene, 5-isopropyl-2-heptene, 2-decene, 2,3,4-trimethyl-6-dodecene, 1,3-tetradecadiene, 4-eicosene, 1-(3-butenyl)-4-ethylbenzene, 1-(3-pentenyl)-3-methylcycloheptene, 1,3-octadiene, 1,4,7-decatriene and the like, and mixtures thereof.

The amount of ruthenium hydride complex employed in the isomerization processes can vary widely. Preferably, an amount of complex is used which affords a reasonable amount of isomerization within a reasonable reaction period of time. In general, ruthenium hydride complex:olefin weight ratios of from about 0.001 to about 10 parts by weight of complex per 100 parts by weight of olefin are suitable to the practice of that invention. Time will be about 0.2 – 100 hours.

The isomerization processes can be carried out as either a batch or as a continuous process using any conventional apparatus. Depending on the mode of reaction and other conditions, such as reaction temperature, complex:olefin weight ratio and contact time, the process can be carried out at any convenient pressure ranging from subatmospheric to about 2000 psig and more preferably from about 0–2000 psig.

The isomerization reaction temperatures can vary widely. In general, the reaction temperature should be such that the reactants and ruthenium complex composites are stable and do not decompose into undesirable by-products or inactive complex composites. Thus, the isomerization process is generally carried out at a temperature in the range of from about −20° C. to about 70° C. and preferably at a temperature in the range of about 0° C. to about 50° C. Ordinarily, the temperature should not exceed about 80° C., at which temperature decomposition of the complex can begin.

The reaction products can be separated from the reaction mixture by any method known in the art. Suitable separation techniques include filtration, distillation, decantation, adsorption and the like.

OBJECTS OF THE PRESENT INVENTION

It is a principal object of the present invention to rejuvenate ruthenium hydride complex isomerization catalysts.

It is a further object of the present invention to provide a method for restoring the activity of ruthenium hydride complex isomerization catalysts after the activity of the catalyst has been diminished through use in an olefin isomerization process.

It is a still further object of the present invention to provide a method whereby the activity of ruthenium hydride isomerization catalysts can be continuously restored or enhanced while it is being used for isomerizing olefins.

SUMMARY OF THE PRESENT INVENTION

Rejuvenation of ruthenium hydride isomerization catalysts is accomplished by contacting the catalyst with hydrogen. Contacting the catalysts per se in the absence of an isomerization feed with hydrogen can be done periodically to rejuvenate a spent or partially deactivated catalyst. In the alternative, hydrogen can be introduced during an isomerization reaction to maintain activity of the isomerization catalyst.

DETAILED DESCRIPTION OF THE INVENTION

With the use of hydrogen, restoration of isomerization activity is achieved by catalysts represented by the formula $(R_3Q)_3RuH_2Z$ wherein Q is independently selected from phosphorus, arsenic and antimony; Z is selected from $H_2$, $N_2$ or $NH_3$; and wherein each R is independently selected from organic radicals containing up to 20 carbon atoms, including alkyl, cycloalkyl and aryl hydrocarbyl radicals and mixtures thereof such as alkaryl, aralkyl and alkcycloalkyl.

According to one embodiment of the invention, regeneration of the above isomerization catalyst is achieved in a continuous or batch process by periodically or continuously adding hydrogen to an inert atmosphere maintained over the isomerization reaction mixture. The amount of hydrogen employed is kept at a minimum so that hydrogenation of the olefin is minimized. Generally, an amount of hydrogen ranging from about 1 to 1000 moles $H_2$/mole complex will be employed. Preferably, for regeneration the temperature of the reaction mixture while hydrogen is being added is lowered to a temperature ranging from about −100° C. to about 70° C. and most preferably from about −70° C. to about 30° C. These temperatures are sufficiently low to reduce the vapor pressure of the olefin to a level where little is lost in regeneration and with minimum hydrogenation. The pressure at which the hydrogen is introduced for regeneration purposes can vary from subatmospheric to about 1000 psig, and preferably from about 0 to about 100 psig. The regeneration times can vary from about 0.1 minute to about 100 hours, preferably from about 1 minute to about 20 hours.

Following the hydrogen treatment, the vessel is swept with an inert gas such as argon or helium to remove the hydrogen and the temperature and pressure are adjusted to a favorable level for resumption of isomerization. Optionally, following the hydrogen treatment, the reaction vessel is swept with nitrogen or ammonia to form catalyst complexes based on them and then the vessel is swept with an inert gas to form an isomerization atmosphere.

According to a second embodiment of the invention, an isomerization catalyst as described above is regenerated in the absence of an olefin isomerization feed. In this embodiment the catalyst, after being used for isomerization, can be dissolved in any inert organic solvent such as, for example, benzene, toluene, xylene, tetrahydrofuran, etc., and hydrogen bubbled through the solution. The temperature at which this treatment is conducted depends on the solvent and can range from −90° C. to 30° C. at pressures from 0 to 1000 psig and for time periods ranging from 1 minute to 10 hours.

The invention and the advantages thereof are further illustrated by the following specific examples.

EXAMPLE I

A solution containing 0.02 gram of (triphenylphosphine)$_3$RuH$_2$(N$_2$) in 20 milliliters of toluene was added to a closed vessel in an argon atmosphere held at 25° C. To the solution was added 3 milliliters (∼1.9 grams) of 1-pentene and the mixture was stirred. Periodic sampling of the mixture was made by withdrawing 10 microliters of solution and analyzing it by gas-liquid chromatography. The following results were obtained:

Table I

| Time (Minutes) | n-Pentane (Mole %) | 1-Pentene (Mole %) | Trans-2-Pentene (Mole %) | Cis-2-Pentene (Mole %) |
|---|---|---|---|---|
| 0 | 0 | 100 | 0 | 0 |
| 1 | 0.14 | 62.4 | 35.4 | 2.05 |
| 22 | — | 57.9 | 38.9 | 3.18 |
| 100 | 0.28 | 44.3 | 48.6 | 6.74 |
| 200 | 0.21 | 31.7 | 57.8 | 10.3 |
| 527 | 0.26 | 11.3 | 70.5 | 17.9 |
| 12 days | 0.25 | 2.2 | 76.1 | 21.4 |

The results show the catalyst is effectively converting the 1-olefin to an internal olefin with the predominant isomer being the trans form.

At this point 3 additional milliliters of 1-pentene was added to the closed vessel and stirring and periodic sampling resumed. The following results were found:

Table II

| Time | n-Pentane (Mole %) | 1-Pentene (Mole %) | Trans-2 Pentene (Mole %) | Cis-2 Pentene (Mole %) |
|---|---|---|---|---|
| 0 min. | 0.13 | 51.6 | 37.4 | 10.8 |
| 94 min. | 0.14 | 51.5 | 37.6 | 10.7 |
| 17 hours | 0.16 | 51.1 | 38.0 | 10.8 |

The results show the catalyst to be inactive.

EXAMPLE II

The vessel containing the solution from Example I was placed in a dry ice-acetone bath and hydrogen was bubbled through the solution for 15 minutes. The solution was then left for 25 more minutes under a hydrogen atmosphere at 14 psig. The pressure was reduced to atmospheric by bleeding off the hydrogen and the vessel and its contents brought again to 25° C. Stirring and sampling were resumed. The following results were obtained:

Table III

| Time (Minutes) | n-Pentane (Mole %) | 1-Pentene (Mole %) | Trans-2 Pentene (Mole %) | Cis-2 Pentene (Mole %) |
|---|---|---|---|---|
| 0 | 0.24 | 50.8 | 38.1 | 10.9 |
| 15 | 0.46 | 48.1 | 40.3 | 11.1 |
| 91 | 1.40 | 34.0 | 51.4 | 13.1 |
| 153 | 1.64 | 25.1 | 59.1 | 14.2 |

The results show that regeneration of the catalyst with hydrogen restored its isomerization activity while not affecting the selectivity. Some hydrogenation is occurring as the increase in pentane shows, but the reaction is taking place in a hydrogen atmosphere rather than in a more desirable argon atmosphere.

Those modifications and equivalents which fall within the spirit of the invention are to be considered a part thereof.

What is claimed is:

1. A process for rejuvenating or maintaining activity of a ruthenium hydride complex olefin isomerization catalyst having the formula
   $(R_3Q)_3RuH_2Z$
   wherein
   Q is selected from phosphorus, arsenic and antimony,
   Z is selected from $H_2$, $N_2$ and $NH_3$, and
   R is an organic radical containing up to 20 carbon atoms,
   which process comprises contacting said catalyst at a temperature in the range of from about $-100°$ C. to about 70° C. with hydrogen, the amount of hydrogen employed being in the range from about 1 to 1000 moles of hydrogen per mole of said catalyst but the amount of hydrogen being insufficient to cause substantial hydrogenation of olefins in contact with said catalyst.

2. A process in accordance with claim 1 wherein contacting of the said catalyst is done in the presence of an isomerizable olefin.

3. A process for rejuvenating or maintaining activity of a ruthenium hydride complex olefin isomerization catalyst having the formula
   $(R_3Q)_3RuH_2Z$
   wherein
   Q is selected from phosphorus, arsenic and antimony,
   Z is selected from $H_2$, $N_2$ and $NH_3$, and
   R is an organic radical containing up to 20 carbon atoms,
   which process comprises contacting said catalyst with hydrogen in the absence of an isomerizable olefin.

4. A process in accordance with claim 3 wherein contacting of the said catalyst is carried out at a temperature in the range of from about $-90°$ C. to about 30° C. and at a pressure of about 0 to 1000 psig.

* * * * *